(12) United States Patent
Landrieve

(10) Patent No.: US 8,710,830 B2
(45) Date of Patent: Apr. 29, 2014

(54) SUPPORT MEMBER, ROTATION DEVICE COMPRISING SUCH A SUPPORT AND ROLLING BEARING ASSEMBLY INCLUDING SUCH A DETECTION DEVICE

(75) Inventor: Franck Landrieve, Fondettes (FR)

(73) Assignee: Aktiebolaget SKF, Gothenburg (SE)

( * ) Notice: Subject to any disclaimer, the term of this patent is extended or adjusted under 35 U.S.C. 154(b) by 131 days.

(21) Appl. No.: 13/321,069

(22) PCT Filed: May 19, 2009

(86) PCT No.: PCT/IB2009/053526
§ 371 (c)(1),
(2), (4) Date: Nov. 21, 2011

(87) PCT Pub. No.: WO2010/133924
PCT Pub. Date: Nov. 25, 2010

(65) Prior Publication Data
US 2012/0068695 A1 Mar. 22, 2012

(51) Int. Cl.
*G01B 7/30* (2006.01)

(52) U.S. Cl.
USPC ........................................... 324/207.25

(58) Field of Classification Search
USPC ........................................... 324/207.25
See application file for complete search history.

(56) References Cited

FOREIGN PATENT DOCUMENTS

| DE | 10054530 A1 | 2/2002 |
|----|-------------|--------|
| EP | 0547935 A1 | 6/1993 |
| EP | 1003040 A2 | 5/2000 |
| EP | 1933155 A1 | 6/2008 |

*Primary Examiner* — Reena Aurora
(74) *Attorney, Agent, or Firm* — Bryan Packjian; SKF USA Inc. Patent Department

(57) ABSTRACT

This support member (60) holds at least two sensors (80) with respect to a rotating encoder washer (20) of a rolling bearing assembly (2). It includes an annular ring (62) centered on a central axis ($X_{60}$) and provided with an inner radial surface (64) which forms an abutment and centering means for each sensor (80) with respect to the central axis ($X_{60}$). The support member also includes foot parts (70) extending perpendicularly with respect to the inner radial surface (64) and provided with holes (72, 74, 76) adapted for the passage of connection pins (82, 84, 86) of the sensors (80), in order to connect these sensors (80) to a printed circuit board (50).

15 Claims, 4 Drawing Sheets

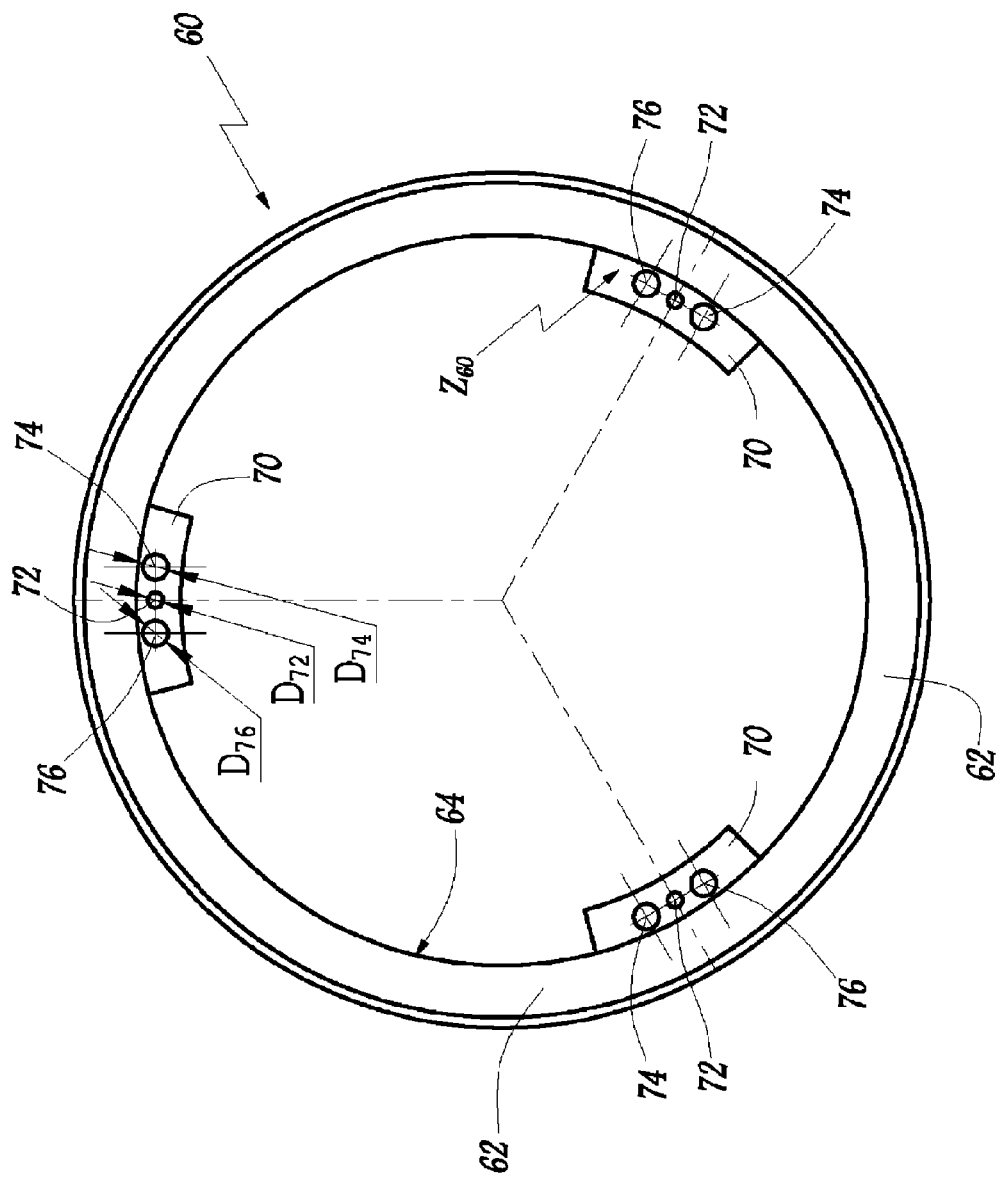

SUPPORT MEMBER, ROTATION DEVICE COMPRISING SUCH A SUPPORT AND ROLLING BEARING ASSEMBLY INCLUDING SUCH A DETECTION DEVICE

CROSS-REFERENCE

This application is the US national stage of International Application No. PCT/IB2009/053526 filed on May 19, 2009.

TECHNICAL FIELD OF THE INVENTION

This invention relates to a support member for holding at least two sensors with respect to a rotating encoder washer, such sensors being used to detect the rotation of the washer and of any part fixed in rotation with respect to this washer. The invention also relates to a rotation detection device which comprises, amongst others, an encoder washer, several sensors, a printed circuit board and a support member as mentioned here-above. Finally, the invention relates to a rolling bearing assembly comprising, amongst others, a rotation detection device of the type mentioned here-above.

BACKGROUND OF THE INVENTION

A rolling bearing comprises an inner ring, an outer ring and several rolling bodies installed between these two rings. These rolling bodies can be balls, rollers or needles. In the meaning of the present invention, a rolling bearing can be, for instance, a ball bearing, a roller bearing or a needle bearing.

In the filed of rolling bearings, it is known to use a tachometer in order to determine the rotation speed of a member supported by a rolling bearing. In such a case, one or several sensors are generally mounted on a printed circuit board or PCB which has to be immobilized with respect to one of the rings of the rolling bearings, the so-called fixed ring. Positioning of the PCB with respect to the fixed ring is not precise, which has a negative influence on the accuracy of the detections obtained via the sensors.

SUMMARY OF THE INVENTION

This invention aims at solving this problem thanks to a support member which allows to accurately position several sensors with respect to a rotating encoder washer.

To this end, the invention concerns a support member for holding at least two sensors with respect to a rotating encoder washer, the support member having:
  an annular ring centered on a central axis and provided with an inner radial surface which forms an abutment and centering means for each sensor with respect to the central axis, and
  foot parts extending perpendicularly with respect to this inner radial surface and provided with holes adapted for the passage of connection pins of the sensors.

Thanks to the invention, the support member can accurately position the sensors with respect to an encoder washer insofar as the inner radial surface of the ring can be used as a reference surface for the sensors, whereas the foot parts allows the connection between the sensors and a PCB, so that the output signals of the respective sensors can be processed by electronic components mounted on such a PCB.

In the present description, the words "axial", "radial", "axially" and "radially" relate to an axis which can be the axis of rotation of the encoder washer or a central axis of the support member ring. A direction is "axial", when it is parallel to such an axis and "radial" when it is perpendicular to and secant with such an axis. A rotation detection device can detect a rotation parameter of one part, such a parameter being representative of a pivoting movement. Such a parameter can be an angle, measuring the angular position of one part with respect to the other, around a central axis of rotation. Such a parameter can also be a speed, a displacement, an acceleration or a vibration.

According to further aspects of the invention which are advantageous but not compulsory, the support member might incorporate one or several of the following features, taken in any technically admissible configuration:
  The annular ring has legs extending parallel to the central axis, up to a respective foot part, the inner radial surface of each leg forming a part of the inner radial surface of the annular ring.
  The inner radial surface of the annular ring is cylindrical, with a circular cross-section.
  The annular ring and the foot parts are made of an integral piece of synthetic material.

The invention also concerns a rotation detection device comprising an encoder washer, several sensors mounted around this encoder washer and a printed circuit board supporting electronic components adapted to process output signals of these sensors, wherein the sensors are mounted on a support member as mentioned here-above, with their connection pins going through the respective holes of the foot parts, so that each sensor is connected to the printed circuit board, and wherein each sensor is in abutment against the inner radial surface of the annular ring of the support member.

Such a detection device is more precise than the ones of the prior art. Moreover, the sensors mounted on the support member can be manipulated as a single sub-unit which is then connected to the printed circuit board by the respective pins of the sensors. Then the sub-unit made of the sensors, the support member and the printed circuit board can be manipulated in order to be easily installed with respect to an encoder washer of a rolling bearing assembly.

According to advantageous aspects of the invention which are not compulsory, the detection device might incorporate one or several of the following features, taken in any technically admissible configuration:
  Spacers are located between the foot parts and the printed circuit board, each spacer defining a central zone for the passage of all the pins of a sensor.
  Each foot part is provided with one first hole, having a diameter adjusted to the diameter of a corresponding sensor pin which goes through this first hole, and at least a second hole, having a diameter more than 25% larger than the diameter of the corresponding sensor pin which goes through this second hole. In such a case, each foot part advantageously has three holes, with its first hole located between its two second holes.
  The support member contacts the printed circuit board only at the level of the foot parts, either directly or via spacers.
  The sensors are Hall effect cells oriented towards a rotation axis of the encoder washer.

Finally, the invention concerns a rolling bearing assembly which comprises a fixed outer ring, a rotating inner ring and a rotation detection device as mentioned here-above, the encoder washer of the rotation detection assembly being fast in rotation with the inner ring of the rolling bearing.

According to an advantageous aspect of the invention, a casing fast in rotation with the outer ring defines a housing for the reception of the support member, the sensors and the printed circuit board. In such a case, the support member can be immobilized in the housing by cooperation of shapes with a corresponding part of the casing and the printed circuit board is held in position within the housing by the support member. In particular, it is possible that the annular ring of the support member is received and wedged in a recess of the casing. A spacer can be used to position the printed circuit board within the housing.

BRIEF DESCRIPTION OF THE DRAWINGS

The invention will be better understood on the basis of the following description which is given in correspondence with the annexed figures and as an illustrative example, without restricting the object of the invention. In the annexed figures:

FIG. 4 is an enlarged view, in the direction of arrow $A_1$ on FIG. 3, of a support member of the invention.

DESCRIPTION OF SOME EMBODIMENTS

Figure 1:
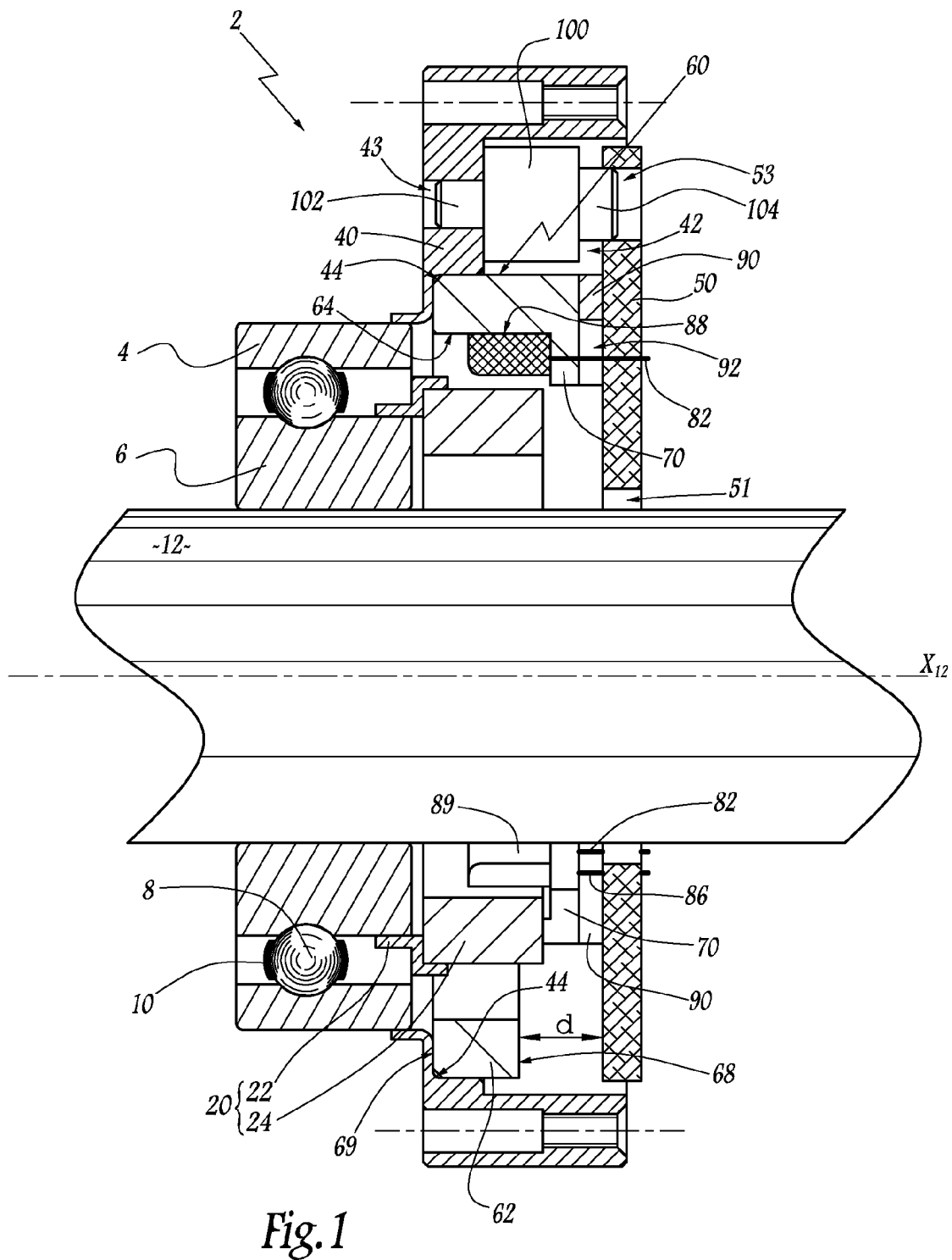
FIG. 1 is an axial cut view of a rolling bearing according to the invention mounted around a rotating shaft.
Figure 2:
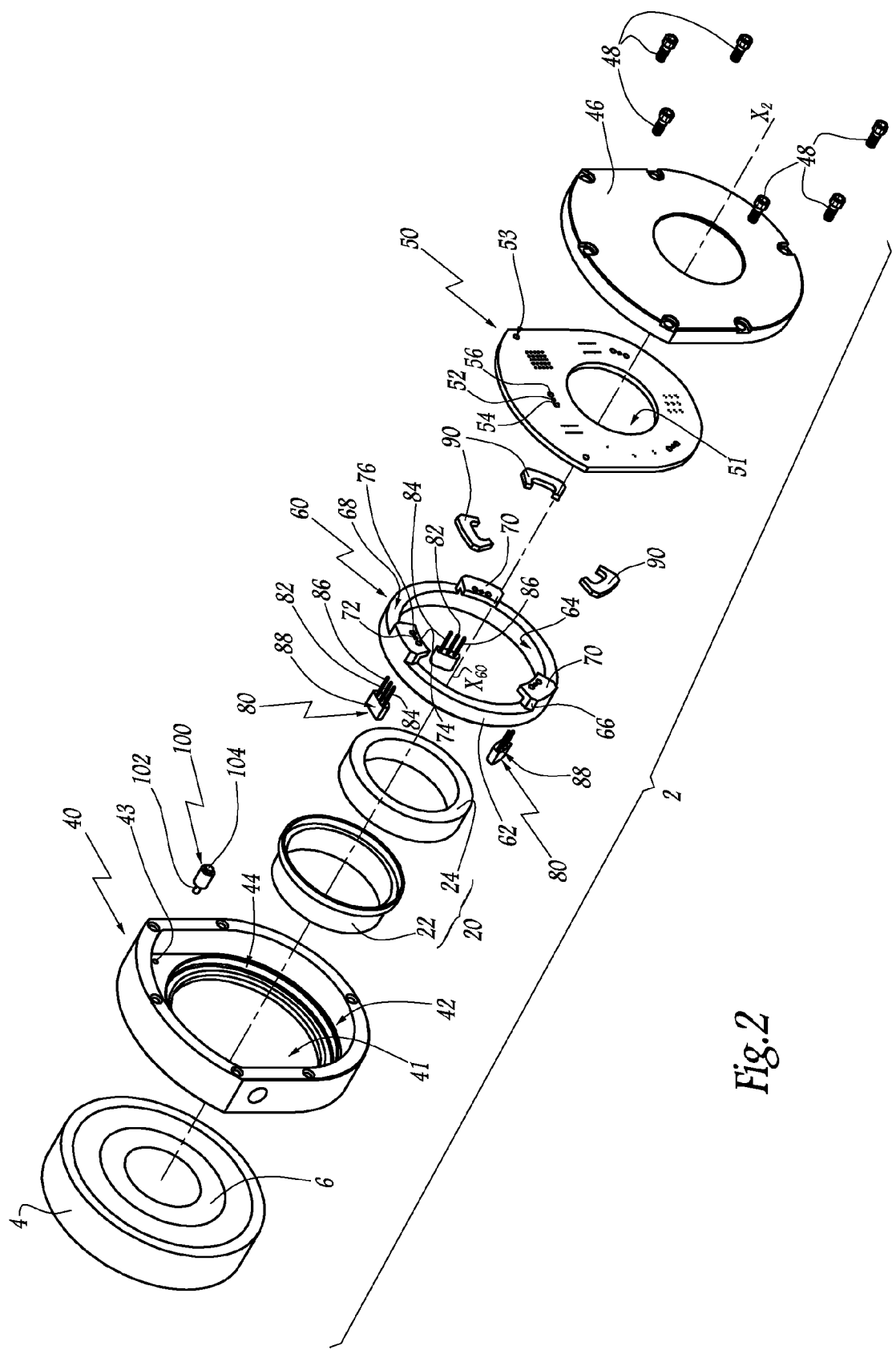
FIG. 2 is a perspective exploded view of the rolling bearing assembly of FIG. 1.

The rolling bearing assembly 2 represented on FIGS. 1 and 2 comprises an outer ring 4, an inner ring 6 and several balls 8 forming rolling bodies located between rings 4 and 6 and held in position with respect to these rings by a cage 10.

Outer ring 4 is supposed to be held in position with respect to a fixed structure which is not represented. Inner ring 6 supports a shaft 12 which rotates around a central axis $X_2$ of rolling bearing assembly 2.

An encoder washer 20 is fixedly mounted on inner ring 6 and comprises an armature 22 and a magnetic part 24 made of a bipolar permanent magnet ring.

Outer ring 4 is fast with a casing 40 which defines a central hole 41 for the passage of shaft 12 and a housing 42 for the reception of a part of encoder washer 20, a printed circuit board or PCB 50, a support member 60 and three sensors 80 in the form of Hall effect cells.

Alternatively, outer ring 4 can be integral with casing 40. PCB 50 has a main hole 51 for the passage of shaft 12.

Support member 60 is made of a molded or machined piece of non conductive material, for instance a synthetic material such as PEEK which has good mechanical and thermal stability properties and includes an annular ring 62 having an inner radial cylindrical surface 64 with a circular cross section centered on a axis $X_{60}$ which is superimposed with axis $X_2$ when support member 60 is mounted within housing 42.

Annular ring 62 has three legs 66 which extend parallely to axis $X_{60}$ from one edge 68 of ring 62. The surface of each leg 66 which is oriented towards axis $X_{60}$ is a part of inner surface 64. In other words, legs 66 belong to ring 62 and their internal surfaces are flush with the internal circular surface of ring 62.

Opposite to the annular part of ring 62, each leg 66 ends with a foot part 70 which extends perpendicularly to axis $X_{60}$, radially towards this axis. Each foot part 70 is provided with three holes 72, 74 and 76 of a size adapted to allow connection pins 82, 84 and 86 of one sensor 80 to go through a foot part 70, in order to be soldered in respective holes 52, 54 and 56 of PCB 50.

Pins 82, 84 and 86 are made of conductive leads.

Next to each foot part 70, support member 60 defines a zone $Z_{60}$ for the reception of the body 89 of a sensor 80 in a position where it is connected to PCB 50 by its respective connection pins 82, 84 and 86, through the respective holes 72, 74 and 76 of a respective foot part 70.

Figure 3:
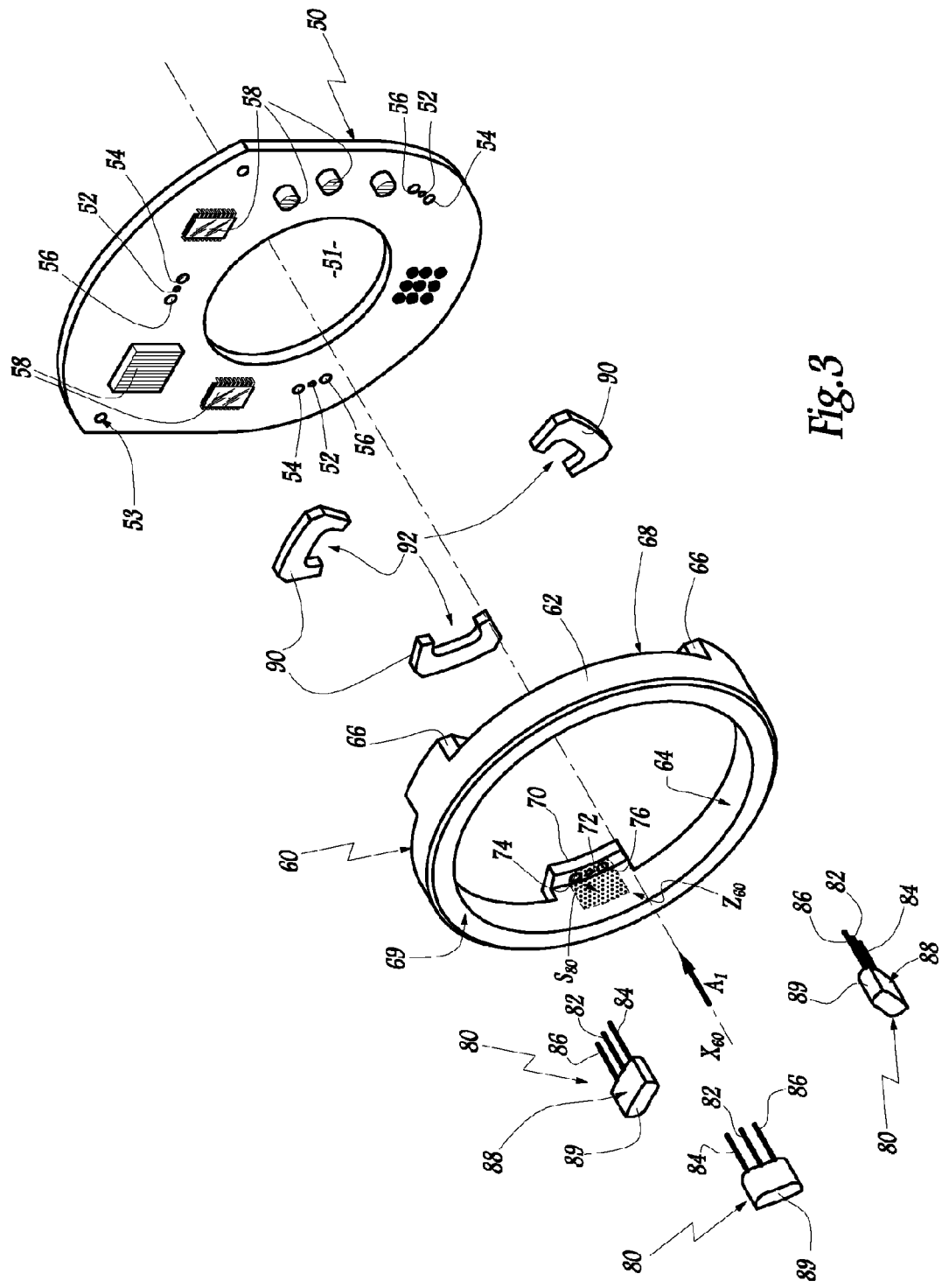
FIG. 3 is a perspective exploded view of a part of a rotation detection device of the bearing of FIGS. 1 and 2.

The back side 88 of the main body 89 of each sensor 80 is glued on a part of surface 64 defined by a leg 66 and the neighboring zone of surface 64 defined by the annular part of ring 62. This gluing surface $S_{80}$ is identified with dots on FIG. 3.

Therefore, inner surface 64 forms an abutment and centering means for each sensor 80, so that, when the pins 82 to 86 have been introduced within the respective holes 72 to 76 of a foot part 70, these sensors are accurately positioned with respect to axis $X_{60}$.

U-shaped spacers 90 are interposed between foot parts 70 and PCB 50. They define a central hollow space 92 for the passage of connecting pins 82 to 86 between holes 72 to 76 and holes 52 to 56. Alternatively, spacers 90 could have another shape, e.g. rectangular. Spacers 90 are optional and foot parts 70 can lie directly against PCB 50.

Once sensors 80 have been mounted on support member 60 and PCB 50 has been positioned with respect to support member 60 so that the respective pins 82 to 86 go through respective holes 52 to 56, these pins can be soldered to the non represented circuit tracks printed on PCB 50. Sensors 80 are then connected to respective electronic components 58 mounted on PCB 50 so that the output signals of these sensors can be processed and forwarded to an electronic control unit in an exploitable form. PCB 50 is connected to the non represented electronic control unit via non represented electrical cable.

Casing 40 has a recess 44 whose shape is complementary to the shape of the edge 69 of annular ring 62 which is opposite to legs 66. Recess 44 is thus adapted to accommodate edge 69 in such a way that support member 60 is wedged onto casing 40, in a position where axes $X_2$ and $X_{60}$ are superimposed. Therefore, support member 60 cooperates with casing 40 in order to position sensors 80 with respect to axis $X_2$. In other words, thanks to support member 60, sensors 80 can be accurately positioned with respect to encoder washer 20, so that the rotation of shaft 12 and ring 6 can be efficiently detected.

Support member 60 contacts PCB 50 only at the level of foot parts 70, via spacers 90. This leaves room on PCB 50 for electronic components 58. As shown on FIG. 1, because of legs 66, edge 68 of ring 62 extends at an axial distance d from PCB 50 when sensors 80 are soldered to the conductive tracks of PCB 50, so that ring 62 does not interfere with electronic components 58. This allows casing 40 to be compact in a direction parallel to axis $X_2$. In practice, distance d is chosen between 1 and 3 mm and spacers 90 allow to adjust its value. Electronic components 58 are not represented on FIG. 1, for the sake of clarity.

References $D_{72}$, $D_{74}$, $D_{76}$ respectively denote the diameters of holes 72, 74 and 76. Hole 72 is in a central position with respect to holes 74 and 76, insofar as it is located between these two holes. Diameter $D_{72}$ is adjusted to the diameter $D_{82}$ of pin 82. In other words diameter $D_{72}$ is equal or slightly larger, by less than 10%, than the diameter $D_{82}$. This construction allows to exactly define the position of each sensor 80 with respect to support member 60 in a rotation direction around axis $X_{60}$. On the other hand, diameters $D_{74}$ and $D_{76}$ are substantially larger, at least by 25%, and preferably by 50%, than the respective diameters $D_{84}$ and $D_{86}$ of connection pins 84 and 86, so as to avoid any risk of hyperstatism between one sensor 80 and support member 60.

Holes 52, 54 and 56 respectively have substantially the same diameters as holes 72, 74 and 76, which also avoids hyperstatism.

In other words, surface 64 allows to precisely define the position of each sensor 80 radially with respect to axis $X_{60}$, and thus axis $X_2$ when support member 60 is mounted onto casing 40, whereas holes 72 allow to precisely define the position of sensors 80 in rotation around axis $X_{60}$, and thus $X_2$.

A spacer 100 is mounted in casing 40, within housing 42, and has two pins 102 and 104 respectively engaged in corresponding holes 43 and 53 of casing 40 and PCB 50. Spacer 100 participates to the positioning of PCB 50 within housing 42 and avoids that, during insertion of elements 50, 60 and 80 within housing 42, high shear stresses are applied on the soldering points of pins 82 to 86 onto PCB 50.

Due to the mounting method of support member 60 on casing 40, printed circuit board 50 does not influence the position of sensors 80 with respect to encoder washer 20, so that the standard tolerances can be used during manufacturing of this PCB. Actually, support member 60 also positions PCB 50 with respect to casing 40.

A cover 46 is fixed on casing 40 by screws 48, so that it closes housing 42 and protects elements 50, 60, 80 and 90 from the outside atmosphere. For the sake of clarity, elements 46 and 48 are represented on FIG. 2 only.

In the example described here-above, three sensors 80 are mounted on support member 60 and regularly distributed around axis $X_{60}$, thanks to the geometry of legs 66. A different number of legs and sensors can be used, e.g. two or more than four. The geometry of support member 60 is then adapted.

Legs 66 are not compulsory and foot parts 70 could extend from edge 68 inwardly towards axis $X_{60}$. In such a case, distance d is null, unless one uses spacers 90, and components 58 must be distributed on PCB 50 in order not to interfere with support member 60.

The invention claimed is:

1. A support member for holding at least two sensors with respect to a rotating encoder washer, wherein said support member has:
   an annular ring centered on a central axis and provided with an inner radial surface which forms an abutment and centering means for each sensor with respect to the central axis, and
   foot parts extending perpendicularly with respect to the inner radial surface and provided with holes adapted for a passage of connection pins of said sensors.

2. The support member according to claim 1, wherein said annular ring has legs extending each parallel to said central axis, up to a respective foot part, the inner radial surface of each leg forming a part of the inner radial surface of said annular ring.

3. The support member according to claim 1, wherein the inner radial surface of said annular ring is cylindrical, with a circular cross section.

4. The support member according to claim 1, wherein said annular ring and the foot parts are made of an integral piece of synthetic material.

5. A rotation detection device comprising:
   an encoder washer,
   several sensors mounted around said encoder washer, and
   a printed circuit board supporting electronic components adapted to process output signals of said sensors, wherein
   said sensors are mounted on a support member, with their connection pins going through the respective holes of said foot parts, so that each sensor is connected to said printed circuit board, and wherein
   each sensor is in abutment against said inner radial surface of said annular ring of said support member, and wherein the support member comprises:
   an annular ring centered on a central axis and provided with an inner radial surface which forms an abutment and centering means for each sensor with respect to the central axis, and
   foot parts extending perpendicularly with respect to the inner radial surface and provided with holes adapted for a passage of connection pins of said sensors.

6. The detection device according to claim 5, wherein spacers are located between said foot parts and said printed circuit board, each spacer defining a central zone for the passage of all the pins of one sensor.

7. The detection device according to claim 5, wherein each foot part is provided with:
   one first hole having a diameter adjusted to the diameter of a corresponding sensor pin which goes through this first hole, and
   at least a second hole, having a diameter more than 25% larger than the diameter of the corresponding sensor pin which goes through this second hole.

8. The detection device according to claim 7, wherein each foot part has three holes, with its first hole located between, its two second holes.

9. The detection device according to claim 5, wherein said support member contacts said printed circuit board only at the level of the foot parts, either directly or via spacers.

10. The detection device according to claim 5, wherein said sensors are Hall effect cells oriented towards a rotation axis of said encoder washer.

11. A rolling bearing assembly comprising a fixed outer ring, a rotating inner ring and a rotation detection device, the encoder washer of said rotation detection device being fast in rotation with said inner ring, and the rotation detection device comprises:
   an encoder washer,
   several sensors mounted around said encoder washer, and
   a printed circuit board supporting electronic components adapted to process output signals of said sensors, wherein
   said sensors are mounted on a support member, with their connection pins going through the respective holes of said foot parts, so that each sensor is connected to said printed circuit board, and wherein
   each sensor is in abutment against said inner radial surface of said annular ring of said support member, and wherein the support member comprises:
   an annular ring centered on a central axis and provided with an inner radial surface which forms an abutment and centering means for each sensor with respect to the central axis, and
   foot parts extending perpendicularly with respect to the inner radial surface and provided with holes adapted for a passage of connection pins of said sensors.

12. The rolling bearing assembly according to claim 11, wherein a casing is rotationally fastened with said outer ring and defines a housing for the reception of said support member, said sensors and said printed circuit board.

13. The rolling bearing assembly according to claim 12, wherein said support member is immobilized in said housing by cooperation of shapes with a corresponding part of said casing and said printed circuit board is held in position within said housing by said support member.

14. The rolling bearing assembly according to claim 13, wherein said annular ring of said support member is received and wedged in a recess of said casing.

15. The rolling bearing assembly according to claim 12, wherein the roller bearing assembly further comprises at least one spacer for positioning said printed circuit board within said housing.

* * * * *